No. 617,107. Patented Jan. 3, 1899.
E. L. LOWE.
POLE OR SHAFT COUPLING BOLT FOR VEHICLES.
(Application filed Apr. 21, 1898.)
(No Model.)
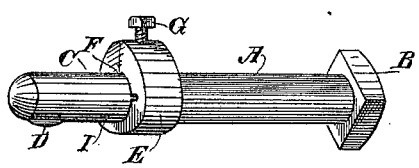
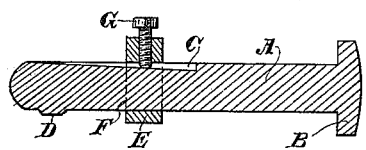
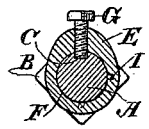
Witnesses,
Inventor
Enoch L. Lowe

UNITED STATES PATENT OFFICE.

ENOCH LOUIS LOWE, OF SAN FRANCISCO, CALIFORNIA, ASSIGNOR TO SUSAN LOWE, OF SAME PLACE.

POLE OR SHAFT COUPLING BOLT FOR VEHICLES.

SPECIFICATION forming part of Letters Patent No. 617,107, dated January 3, 1899.

Application filed April 21, 1898. Serial No. 678,325. (No model.)

*To all whom it may concern:*

Be it known that I, ENOCH LOUIS LOWE, a citizen of the United States, residing in the city and county of San Francisco, State of California, have invented an Improvement in Vehicle Pole or Shaft Coupling Bolts; and I hereby declare the following to be a full, clear, and exact description of the same.

My invention relates to an improved bolt to be used in conjunction with the pole or shaft couplings of vehicles.

It consists, essentially, of a threadless bolt having a head upon one end, a longitudinal groove or channel at the outer end, a raised guard or shoulder near the outer end of the bolt out of line with the slot or channel, and a threadless nut having a guide groove or channel corresponding with the raised guard upon the bolt, so as to guide the nut passing over said guard, a set-screw passing through the nut and adapted to engage the groove or channel, so as to lock the nut against the coupling-lugs after the bolt has been inserted, said nut having a greater weight upon one side than the other, whereby the guiding-groove is carried and held out of line with the raised shoulder of the bolt, so that the latter serves as a supplemental lock to prevent the nut being removed from the bolt if the set-screw becomes loosened.

It also comprises details of construction, which will be more fully explained by reference to the accompanying drawings, in which—

Figure 1 is a view of the bolt and nut. Fig. 2 is a longitudinal section of the same. Fig. 3 is a cross-section of the same through the center of nut.

The object of this invention is to provide a cheap and easily-operated fastening for the pole and shaft couplings of carriages, one in which the parts may be easily put together or removed and with little or no wear, and a safety device to prevent their becoming accidentally displaced.

A is a bolt, which may be made of any suitable or desired material of sufficient hardness and strength for the purpose. This bolt has a head B, which may also be of any suitable or desired shape, and the length of the bolt is sufficient to pass through the lugs and eyes of the shaft or pole couplings. The bolt is made without screw-threads and has formed longitudinally upon one side a slot or channel C. This slot or channel may be made shallow at the outer end of the bolt and deepen toward the inner end to such a point that when the nut is in place upon the bolt abutting against the shaft-coupling lugs it will still be in line with this slot. The slot may have a gradual slope or it may be in the form of successive steps deepening from the outer toward the head end. The sides are preferably vertical, so as to retain the set-screw when the latter is inserted and screwed down to its bearing. Upon the side of the bolt, out of line with this slot, is a projecting lug D. This lug is formed with or secured to the bolt, extending longitudinally a short distance from the outer end, and is preferably curved upon its projecting edge, each end being approximately flush with the surface of the bolt, while the center is considerably higher. This lug serves as a guide for the nut when the latter is placed upon the bolt and also serves as a guard to prevent the nut from being removed after it is in place, as will be hereinafter described. By making the lug as described the nut will easily slip over it without catching.

The nut E has a hole F made through it to fit the bolt, this hole being nearer to one side of the nut than the other, and the nut is preferably made longer in one direction than the other, so that the distance from the hole toward the longer side is greater than in any other direction. Through this longer side of the nut a set-screw G is fitted. This set-screw has any suitable form of head to receive a wrench by which it may be turned, or it may have a slot or channel across it to receive the end of a screw-driver, if preferred. The inner end of the set-screw is adapted to fit into the longitudinal slot or channel of the bolt after the nut has been slipped upon the bolt and moved up close against the lugs of the coupling. The screw then being turned in until it bites or binds against the bottom of the slot, the nut will be locked in place. The nut has lines or marks made upon its sides in line with the set-screw and the channel, so that there will be no difficulty in bringing the set-screw into line with the channel.

The hole in the nut has a small groove or channel I made upon one side, which groove or channel will be coincident with the raised lug or guard D upon the bolt when the nut is slipped over the bolt. This groove and raised guard serve as a guide for the nut when it is slipped upon the bolt, and as the nut passes beyond this guard it may be turned a part of a revolution, so as to bring the set-screw into line with the groove or channel with which it is interlocked. It will thus be seen that the groove I in the nut will be out of line with the raised lug, and even if the set-screw should become loosened the guard will prevent the nut from slipping off the bolt. This is rendered more effectual by the nut being made longer and heavier upon one side, so that this portion will naturally hang downward by gravitation and will prevent the groove in the nut from coming into line with the lug on the bolt. The taper of the groove or channel in the bolt with which the set-screw engages also serves to keep the nut in place even if the set-screw should become somewhat loosened, as the point of the screw will still bind against the shallower part of the groove or channel sufficiently to prevent the nut being removed.

This construction makes it easy to insert and remove the bolts. There are no threads to become rusted or broken by careless efforts to put on a nut. The parts can be put together and removed without the use of any wrenches or tools, except for the purpose of securing the set-screw. As these bolts lie close to the woodwork of the axle, the use of wrenches upon them is very apt to mar the woodwork, and this is avoided by my construction.

It will be understood that any usual or ordinary mechanical devices may be substituted in this construction for those which I have described and any suitable or desired material used for the parts.

Having thus described my invention, what I claim as new, and desire to secure by Letters Patent, is—

1. A threadless coupling-bolt headed at one end, a threadless nut adapted to slip over the other end, a longitudinal groove or channel made in the surface of the bolt increasing in depth from the outer toward the inner end, and a set-screw passing through the nut adapted to engage said slot or channel when the nut is in place.

2. A threadless, headed coupling-bolt having a groove or channel formed longitudinally from the outer end toward the head, a threadless nut adapted to slip over the bolt having a set-screw passing transversely through it adapted to engage and interlock with the groove or channel when the nut is in position, and a raised lug or guard upon the bolt out of line with the groove or channel whereby the nut is prevented from slipping off the bolt.

3. A threadless, headed coupling-bolt having a longitudinal groove or channel with vertical sides from the outer end toward the head, a threadless nut fitting said bolt having a set-screw passing through it transversely and adapted to engage and interlock with the groove or channel after the nut is in position, a raised longitudinal lug upon the side of the bolt out of line with the groove or channel, and a groove formed in the interior of the nut adapted to slip over said lug when the nut is placed upon the bolt, said groove being turned out of line with the raised lug when the set-screw is engaged with the channel of the bolt.

4. A headed, threadless coupling-bolt having a longitudinal groove or channel increasing in depth from the outer end toward the head, a threadless nut fitting a bolt and having a transverse set-screw passing through one side and adapted to engage and interlock with the groove or channel on the bolt, a longitudinally-tapered lug projecting from one side of the bolt out of line with the groove or channel therein, a groove made in one side of the hole in the nut adapted to slip over the raised lug when the nut is placed upon the bolt, the groove being disengaged from the lug so that the nut may be turned to bring the set-screw into line with its interlocking groove or channel and the groove in the nut out of line with the lug upon the bolt, said nut being made thicker upon one side, so that the thicker side will hang downward by gravitation to retain the groove in the nut out of line with the lug upon the bolt.

In witness whereof I have hereunto set my hand.

ENOCH LOUIS LOWE.

Witnesses:
JAMES O. KELSHAW,
JOHN N. BECK.